United States Patent
Rao

(10) Patent No.: US 6,909,672 B2
(45) Date of Patent: Jun. 21, 2005

(54) TIME-TO-VOLTAGE CONVERTER

(75) Inventor: Naresh Kesavan Rao, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 246 days.

(21) Appl. No.: 10/065,179

(22) Filed: Sep. 24, 2002

(65) Prior Publication Data

US 2004/0056202 A1 Mar. 25, 2004

(51) Int. Cl.[7] .............................................. G04C 21/16
(52) U.S. Cl. ...................... 368/251; 368/119; 368/121
(58) Field of Search ...................... 368/113, 118–121, 368/251; 327/7, 17, 24, 144; 341/141, 155

(56) References Cited

U.S. PATENT DOCUMENTS

| | | | | |
|---|---|---|---|---|
| 4,928,184 A | * | 5/1990 | Tsunekawa et al. | 386/118 |
| 5,122,996 A | * | 6/1992 | Sasaki et al. | 368/113 |

* cited by examiner

Primary Examiner—Kamand Cuneo
Assistant Examiner—Thanh S. Phan
(74) Attorney, Agent, or Firm—Jean K. Testa; Patrick K. Patnode

(57) ABSTRACT

A time interval to voltage converter with very low nonlinearity for time stamping events. The converter automatically selects one of two clocks related to a reference clock and ensures that the time between an event edge to a clock edge is sufficiently large to properly operate a switch and yield very linear time-to-voltage conversion.

30 Claims, 8 Drawing Sheets

TIME-TO-VOLTAGE CONVERTER

BACKGROUND OF THE INVENTION

This invention generally relates to time stamping of events in computerized systems. In particular, the invention relates to time stamping of events in imaging systems used in medical diagnostics.

Modern medical diagnostic imaging systems typically include circuitry for acquiring image data and for transforming the data into a useable form, which is then processed to create a reconstructed image of features of interest within the patient. The image data acquisition and processing circuitry is referred to as a "scanner", regardless of the modality, if physical or electronic scanning occurs as part of the imaging process. The particular components of the system and related circuitry, of course, differ greatly between modalities due to their different physics and data processing requirements.

Positron emission tomography (PET) is an imaging modality based on the detection of gamma ray pairs produced by annihilation of a positron and electron within the human body as a result of patient ingestion of radioactive tracers. After generation within a patient, the gamma rays move in opposite directions. A PET system is generally depicted in FIG. 1. A circular ring 102 of detectors placed around the patient detects the gamma rays. A respective ASIC (application-specific integrated circuit), comprising a respective time pick-off comparator 104 and a respective gate generator 106, processes the signal from each detector to determine the position of the event, the time at which it occurred and the energy of the event. A coincidence processor 108 receives information from all of the ASICs placed adjacent to the detectors. It then pairs up events that occurred at the same time and reconstructs the point on the patient where the gamma rays must have originated. The energy, position and time for each detected photon pair must be processed to determine a valid event and to reconstruct the image.

There are two ways of performing the time stamp operation. One method employs high-speed PLLs and the other method uses a time-to-voltage converter followed by digitizer.

A time-to-voltage converter generates a voltage proportional to the time elapsed from an event to a rising edge of a system clock. As a result of this operation, it is possible to measure the time in terms of voltage and in essence generate a time stamp corresponding to that event. This time stamp is later used when reconstructing the image, and is a necessary tool for the proper operation of the PET scanner itself.

Accuracy in time stamping an event in a PET system is a key CTQ (critical to quality) parameter. Each event has to be time stamped to an accuracy of +/−1 nsec. This typically requires complicated circuits, such as high-speed PLLs. High-speed PLLs time stamp an event with respect to a high-speed clock. In contrast, a time-to-voltage converter integrates a current on a capacitor to create a voltage proportional to the time between an event and a rising edge of a system clock.

A time-to-voltage converter having the traditional architecture is shown in FIG. 2. This time-to-voltage converter typically consists of a current source 10, a capacitor 12 and an analog-to-digital converter (ADC) 14. An event turns on the current source 10 and charges the capacitor 12 until the next rising edge of a reference clock (not shown), which turns off the current source. The time between the event and reference clock is therefore represented as a voltage on the capacitor 12.

More specifically, the time-to-voltage converter generates a voltage proportional to the time elapsed from an event to a rising edge of a system clock. The output of the time pick-off comparator causes the START switch to be closed. The current $I_{ref}$ is integrated on the feedback capacitor 12 (called $C_{int}$) until the next rising edge of the system clock, which closes the STOP switch and diverts the reference current to ground. The START/STOP switches are embodied as a single-pole double-throw switch 16. The voltage at the output of a time-voltage amplifier 20 is $V = I_{ref}$ (delta T)/$C_{int}$ where delta T is the time elapsed between the onset of the event and the next rising edge. If one wants to time stamp an event to a resolution of 1 nsec with a 4 MHz system clock, one needs at least an 8-bit ADC. Assuming that the maximum voltage at the output of the amplifier 20 is 2 V, the minimum voltage generated by an event 1 nsec before a rising edge of a clock is 2 V/256=7.8 mV. A current $I_{ref}$ of 7.8 microamperes and a capacitance $C_{int}$ of 1 pF can attain a voltage step of 7.8 mV. Process variations in $I_{ref}$ and $C_{int}$ can be calibrated out. Even propagation delays of the comparator and the switches can be calibrated out. A typical duration of an event is 400 nsec. If an event took place just before a rising edge of a clock, then the must finish the conversion and resetting of the time-voltage amplifier 20 within 400 nsec to be ready for the next event. For simplicity of design, one can choose to convert and reset the time-voltage amplifier within 250 nsec (one 4-MHz clock cycle). If an 8-MHz ADC is assumed. this gives 125 nsec (250 nsec−125 nsec) in which to reset the time-voltage amplifier. Assuming that one needs five time constants to reset the time-voltage amplifier, this implies that the GBW of the time-voltage amplifier should be 40 MHz.

There is a remote possibility that the integrator can saturate if there are no events to be registered for a long time. One option is to monitor the output of the ADC periodically, even if there are no events registered. Based on the drift in the ADC counts, the time-voltage amplifier can be issued a reset. The probability of this happening is very low due to the fact that there are 200K events per second on every channel.

One of the problems in the time-to-voltage converter described above is that as delta T becomes smaller, the circuit becomes more nonlinear due to incomplete switch transitions. If delta T is less than the time it takes for the START switch to be fully closed, the current $I_{ref}$ is split between the START switch and the STOP switch. This leads to a nonlinear time to voltage transfer function. An intuitive way of arriving at the same conclusion is to imagine shrinking the width of a pulse with finite rise time and fall time. Eventually, this pulse would become a triangle and further shrinking of this triangle would lead triangles of smaller height and so on.

A similar problem occurs if an event occurred just after the rising edge of the clock. Even though the width of the pulse in this case is much larger than the rise and fall times, the transition of the clock in the digital circuit will interfere with proper operation of the switches. In general, the time-to-voltage converter is very linear if the width of the pulse is significantly larger than the rise and fall times and the event edges are not too close to the rising edge of the clock.

As can be seen from the timing diagram of the traditional time-to-voltage converter, shown in FIG. 3, there is no way to prevent this from occurring when random events are input to the system. As a result, in order to overcome the inherent nonlinearity of this system, a method of ensuring that the above conditions are not violated is required.

SUMMARY OF INVENTION

The invention is directed to a method and apparatus for converting elapsed time into voltage with very low nonlinearity for time stamping events.

One aspect of the invention is a device for converting elapsed time into a voltage, comprising means for referencing an event edge either to a first clock signal, if the event edge occurs during a first portion of a clock cycle of the first clock signal, or to a second clock signal different than the first clock signal, if the event edge occurs during a second portion of a clock cycle of the first clock signal. The first and second portions of the clock cycles of the first clock signal are alternating interludes.

Another aspect of the invention is a method of time stamping an event, comprising the following steps: generating an event edge when an event of interest occurs; generating a voltage proportional to the time elapsed from reception of the event edge; referencing the event edge either to a first clock signal, if the event edge occurs during a first portion of a clock cycle of the first clock signal, or to a second clock signal different than the first clock signal, if the event edge occurs during a second portion of a clock cycle of the first clock signal, wherein the first and second portions of the clock cycles of the first clock signal are alternating interludes; maintaining the generated voltage at a constant value when a rising edge of the referenced one of the first and second clock signals occurs; and digitizing the constant voltage value to form a time stamp.

A further aspect of the invention is a system for time stamping an event, comprising: means for generating a voltage proportional to the time elapsed from reception of an event edge; means for referencing the event edge either to a first clock signal, if the event edge occurs during a first portion of a clock cycle of the first clock signal, or to a second clock signal different than the first clock signal, if the event edge occurs during a second portion of a clock cycle of the first clock signal, wherein the first and second portions of the clock cycles of the first clock signal are alternating interludes; means for maintaining the generated voltage at a constant value when a rising edge of the referenced one of the first and second clock signals occurs; and an analog-to-digital converter for digitizing the constant voltage value to form a time stamp.

Yet another aspect of the invention is a system for time stamping an event, comprising: a circuit for generating a voltage proportional to the time elapsed from reception of an event edge, the circuit comprising a current source, an integrating capacitor and an amplifier connected so that the amplifier outputs a voltage proportional to the time elapsed so long as current is being supplied by the current source; digital logic for outputting clock selecting control signals; a first multiplexer having first and second inputs for receiving first and second clock signals respectively, the first and second clock signals being different, and a third input for receiving the clock selecting control signals, the clock selecting control signals being timed so that the first multiplexer outputs the first clock signal if the event edge occurs during a first portion of a clock cycle of the first clock signal and outputs the second clock signal if the event edge occurs during a second portion of a clock cycle of the first clock signal, wherein the first and second portions of the clock cycles of the first clock signal are alternating interludes; a switch for cutting off current to the amplifier from the current source when the first multiplexer outputs a rising edge of one of the first and second clock signals; and an analog-to-digital converter for digitizing the voltage output by the amplifier.

A further aspect of the invention is a time-to-voltage converter comprising: a circuit for generating a voltage proportional to the time elapsed from reception of an event edge, the circuit comprising a current source, an integrating capacitor and an amplifier connected so that the amplifier outputs a voltage proportional to the time elapsed so long as current is being supplied by the current source; a multiplexer for alternatingly outputting first and second clock signals that are different; and a switch for cutting off current to the amplifier from the current source when the multiplexer outputs a rising edge of one of the first and second clock signals.

Another aspect of the invention is an imaging system comprising an event detector for generating the event edge upon occurrence of an event of interest; and a system for time stamping of one of the types described the preceding paragraphs.

Other aspects of the invention are disclosed and claimed below.

DETAILED DESCRIPTION

Consider the normal operation mode of a time-to-voltage converter when an input event causes the current controlling switch to close in order to charge the integrating capacitor and develop a corresponding voltage. In the embodiments disclosed below, two clocks offset from each other in phase only are utilized in such a way that the case of a clock edge being too close to the event edge can be avoided. This is the principle of a two-phase time-to-voltage converter.

Figure 1:
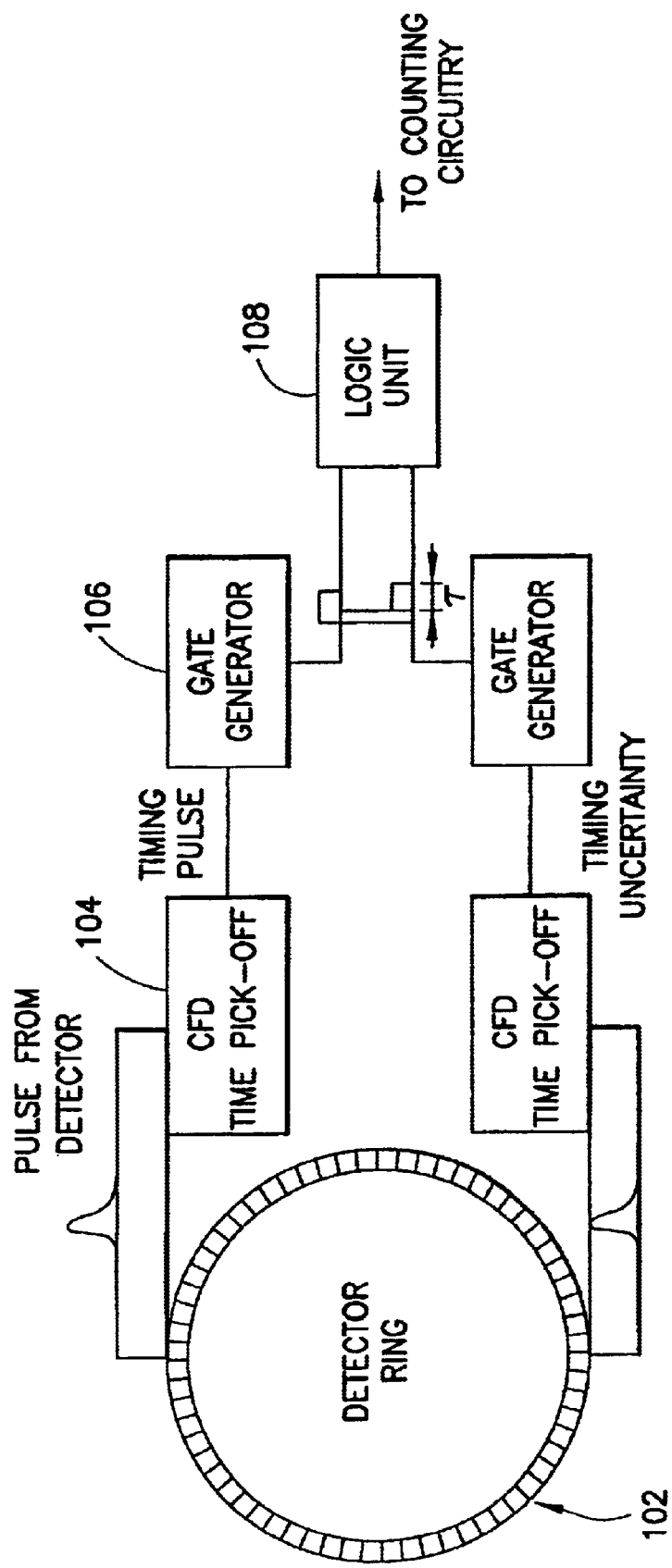
FIG. 1 is a block diagram showing coincidence processing in a PET scanner.
Figure 2:
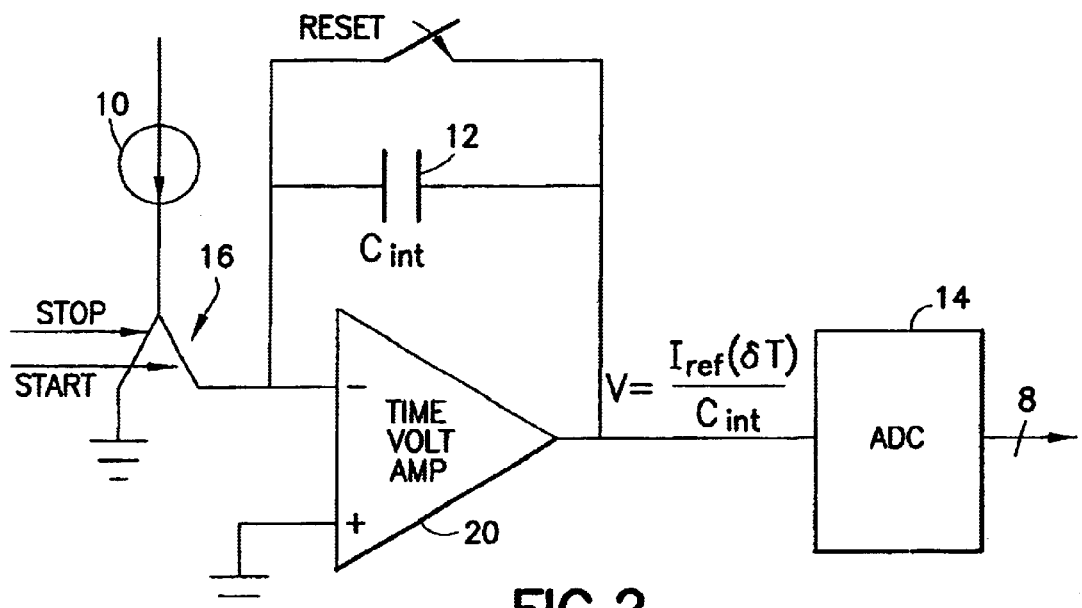
FIG. 2 is a circuit diagram showing the traditional architecture of a time-to-voltage converter.
Figure 3:
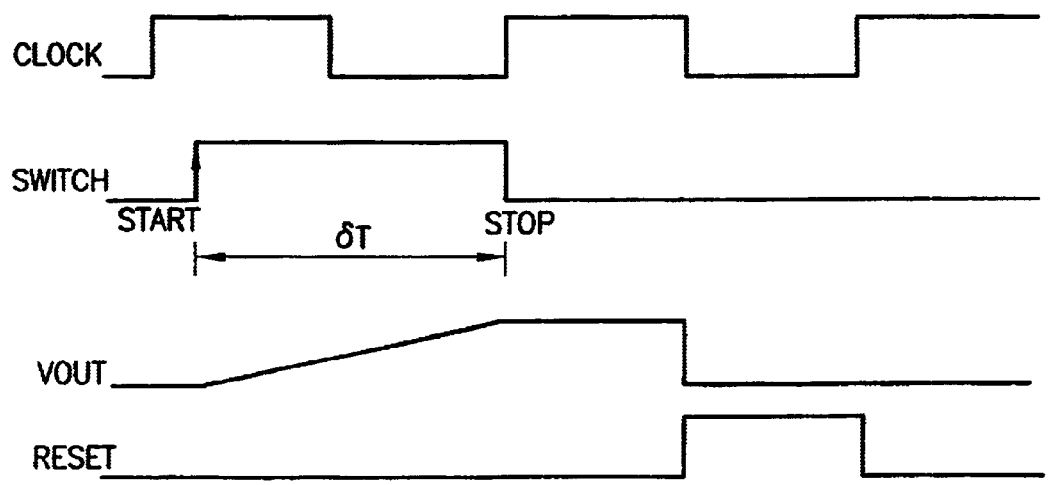
FIG. 3 is a timing diagram for the time-to-voltage converter depicted in FIG. 2.
Figure 4:
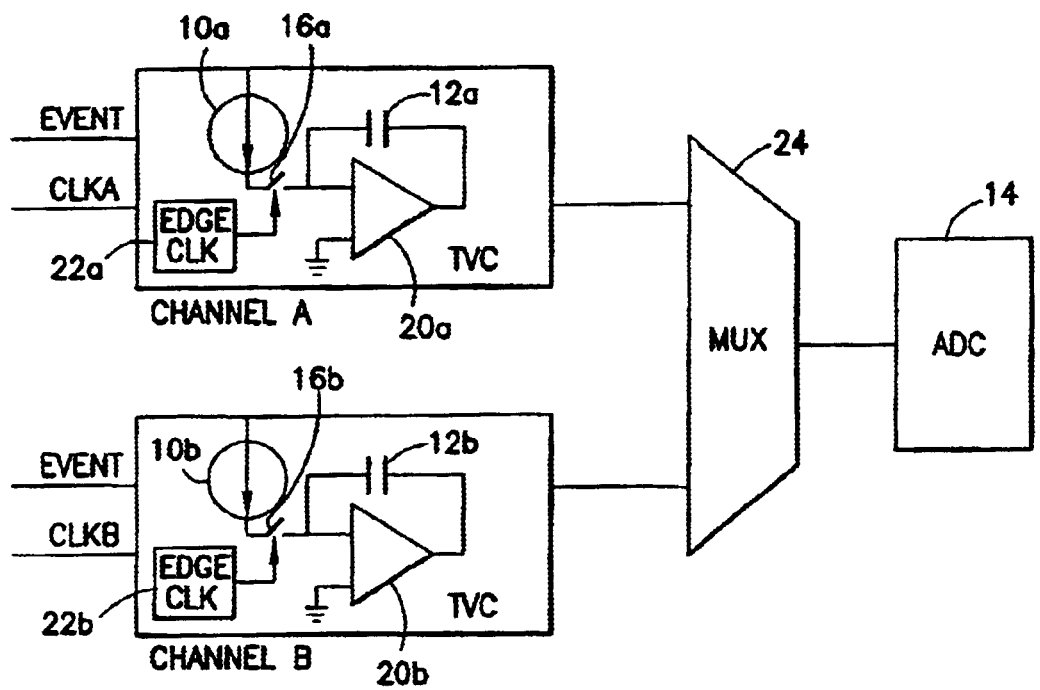
FIG. 4 is a circuit diagram showing a two-phase time-to-voltage converter in accordance with one embodiment of the invention.
Figure 5:
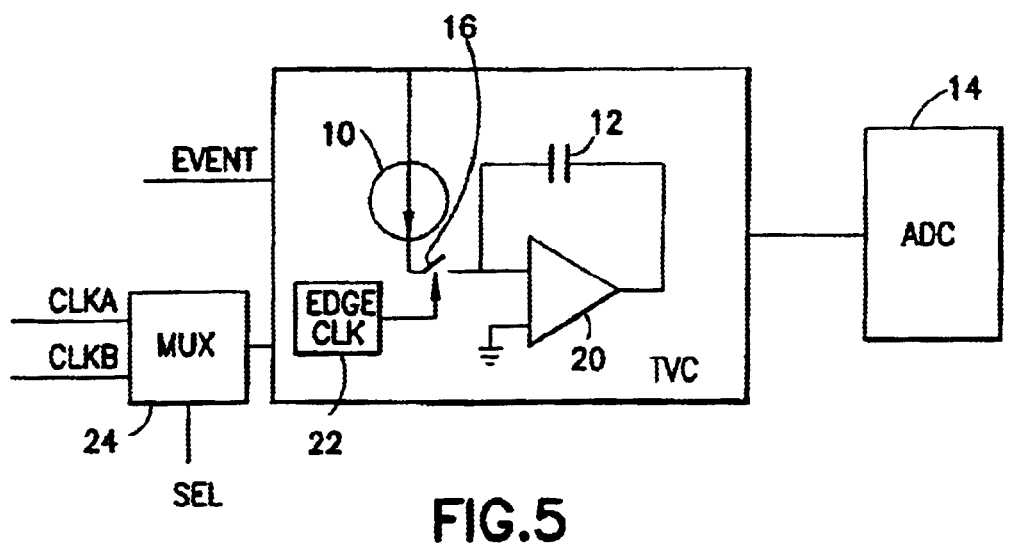
FIG. 5 is a circuit diagram showing a two-phase time-to-voltage converter in accordance with another embodiment of the invention.
Figure 6:
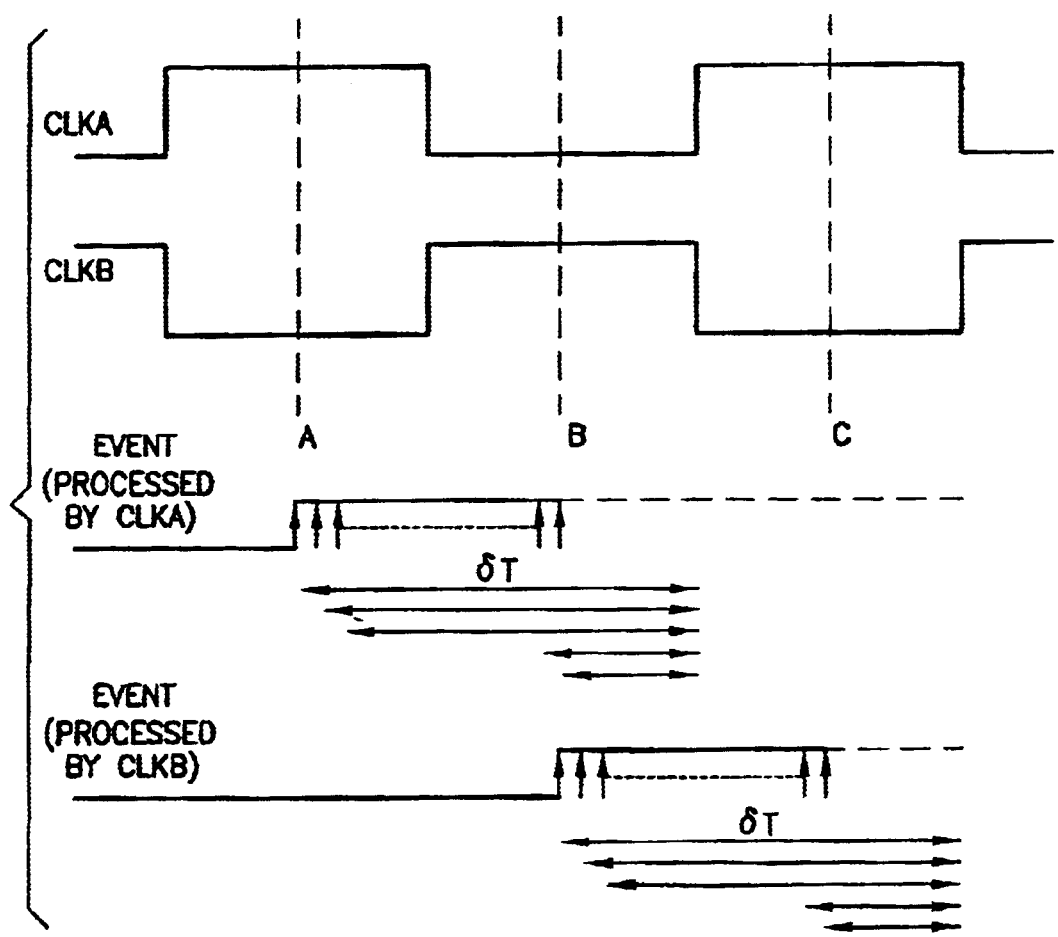
FIG. 6 is a timing diagram for the two-phase time-to-voltage converter depicted in FIG. 5.

Respective system level representations of two-phase time-to-voltage converter circuits that obey the general rules described above to yield a very linear time-to-voltage conversion are shown in FIGS. 4 and 5. FIG. 6 shows the timing diagram for the operation of these circuits.

Referring to FIG. 4, Channel A comprises a current source 10a, an integrating capacitor 12a, a single-pole double-throw START/STOP switch 16a, and a time-to-voltage amplifier 20a, whereas Channel B comprises a current source 10b, an integrating capacitor 12b, a single-pole double-throw START/STOP switch 16b, and a time-to-voltage amplifier 20b. Channel A has respective inputs for receiving the event signal and a clock signal CLKA from a Clock A (not shown), whereas Channel B has respective inputs for receiving the same event signal and a clock signal CLKB from a Clock B (not shown). The respective outputs of Channels A and B are inputted to a multiplexer 24, the output of which is in turn inputted to an ADC 14. Block 22a represents a rising edge in clock signal CLKA, whereas block 22b represents a rising edge in clock signal CLKA.

Referring to FIG. 6, if an event occurs between times A and B, then the event is processed by channel A in FIG. 4. Similarly if an event occurs between times B and C, the event is processed by channel B in FIG. 4. Boundaries A and C are one and the same edge. They are nominally 62.5 nsec from the rising edge of CLKA. Boundary B is nominally 62.5 nsec from the rising edge of CLKB. In the circuit shown in FIG. 4, a current pulse can be created between the rising edge of an event and terminated by the rising edge of the clock or vice versa. There is also sufficient time to reset the channels to avoid drift in the output voltage. Mismatches between capacitors and current sources can be easily calibrated out. Matching of capacitors and current mirrors in CMOS processing is approximately 0.1%, which is better than 8 bits of accuracy. One can also trade off between clock frequency and number of bits. For example, 8 bits of accuracy are needed with a 4-MHz clock to achieve a 1-nsec resolution, whereas 7 bits of accuracy are needed with an 8-MHz clock to achieve the same resolution.

If an event occurs exactly at a boundary of channel processing, both channels will have valid digital outputs. For example, if an event occurred exactly at time B, Channel A would have an integration time of 62.5 nsec if CLKA were to be 250 nsec. Channel B would have an integration time of 187.5 nsec since CLKB is also 250 nsec. As long as the system associates the digital output to the correct channel, both answers .are equally valid. In other words, the time to switch the multiplexer 24 does not affect the linear operation of the time-to-voltage converter. The ADC 14 converts the output voltage of the channels after the rising edge of their respective clocks. Conceptually, one can envision a linear curve fit with the two digital outputs to get better resolution.

The two-phase two-channel circuit described above can be reduced to a two-phase single-channel circuit with additional digital logic. The general rule is that for the time-to-voltage converter to be very linear, the width of the pulse should be significantly larger than the rise and fall times and the event edges are not too close to the rising edge of the clock. Again consider the normal operation mode of a time-to-voltage converter when an input event causes the current controlling switch to close in order to charge the integrating capacitor and develop a corresponding voltage. In the embodiment shown in FIG. 5, the switch controlling the current is opened by a block of digital logic (not shown) that is programmed to select between two clock signals offset from each other in phase only. This block of digital logic can be created in such a way that the case of a clock edge being too close to the event edge can be avoided.

Referring to FIG. 5, the two-phase single-channel circuit comprises a current source 10, an integrating capacitor 12, a single-pole double-throw START/STOP switch 16, a time-to-voltage amplifier 20, and an ADC 14 that receives the amplifier output. The START/STOP switch receives an event edge and a clock edge 22. The clock edge 22 is determined by a multiplexer 24 that receives inputs from respective Clocks A and B. These clocks output respective clock signals CLKA and CLKB that are out of phase, as shown in FIG. 6, by 180 degrees. One full period of the master clock (in this case denoted as CLKA) can be divided into three parts. This has been done with the boundary markers A, B and C. The clock used to terminate the integration is chosen depending on which boundary region the event falls within. For this case the boundary regions are A–B and B–C. As soon as boundary A is crossed, CLKA is selected as the clock signal that will turn off the switch. In other words, any event occurrence within boundary region A–B would use a rising edge of CLKA to terminate the integration of the reference current. Similarly, any event within boundary region B–C would use a rising edge of CLKB to terminate the integration. Since this decision to select the clock is made well before their respective rising edges, propagation delays through the digital blocks will not impact the system.

The time-to-voltage converter generates a voltage proportional to the time between the event and the rising edge of a master clock. A constant current source is turned on by the event and turned off by the rising edge of the master clock. The charge accumulated in the capacitor is proportional to the time between the event and the rising edge of the clock. Both the external current source and the capacitor can vary +/−10% due to process variations. Assuming the use of a 4-MHz clock, 250 nsec has to be binned into a fixed number of digital ADC codes. As a result, the current source, the integration capacitor and the reference voltage of the ADC must be tuned to account for process variations.

One method of accounting for process variations is to use a digital-to-analog converter (DAC). The primary drawback of this approach, however, is that the DAC exhibits a change in output voltage due to temperature variations. As a result, it requires the use of an intricate temperature compensation circuit to accurately control the current.

In accordance with an embodiment of the present invention, a method of auto-calibration is used in order to best compensate for both process variations and a change in current due to temperature. Auto-calibration of the converter is performed by using an auxiliary time-to-voltage converter called TVC_REF, which can be seen in FIG. 7. The same single current source 10 is used for both time-to-voltage converters. For a finite number of its clock cycles, the current source is turned on and sourced to it. The integrated voltage is sampled and held by sample and hold circuit 30 and then this voltage is used to form the basis for the reference voltage VREF of the ADC 14. The output voltage of TVC_REF should be designed to correspond to a time stamp of the full period, which in the previous example was 250 nsec. This can be accomplished by choosing an appropriate value of the integration capacitor 12a.

Within a chip, the matching between capacitors can be accurate to within 0.1% and the matching between internal current sources to within 1%. Therefore, the gain mismatch between TVC_REF and the regular event time-to-voltage converter (TVC in FIG. 7) will be 1%, which limits performance to 6 bits, and therefore is too large to obtain a high resolution.

In order to avoid the 1% error in current sources, the same current source is multiplexed between the reference and event time-to-voltage converters TVC_REF and TVC. The sequence is as follows: The event is integrated in the event time-to-voltage converter TVC. The output of the event TVC is allowed to settle in preparation for the analog-to-digital conversion and subsequent reset of the integration capacitor 12b. During that time, the current source 10 is used in TVC_REF to generate the updated reference voltage of the ADC 14. This voltage is sampled and held, and after the event is processed, it is transferred to the ADC.

Figure 7:
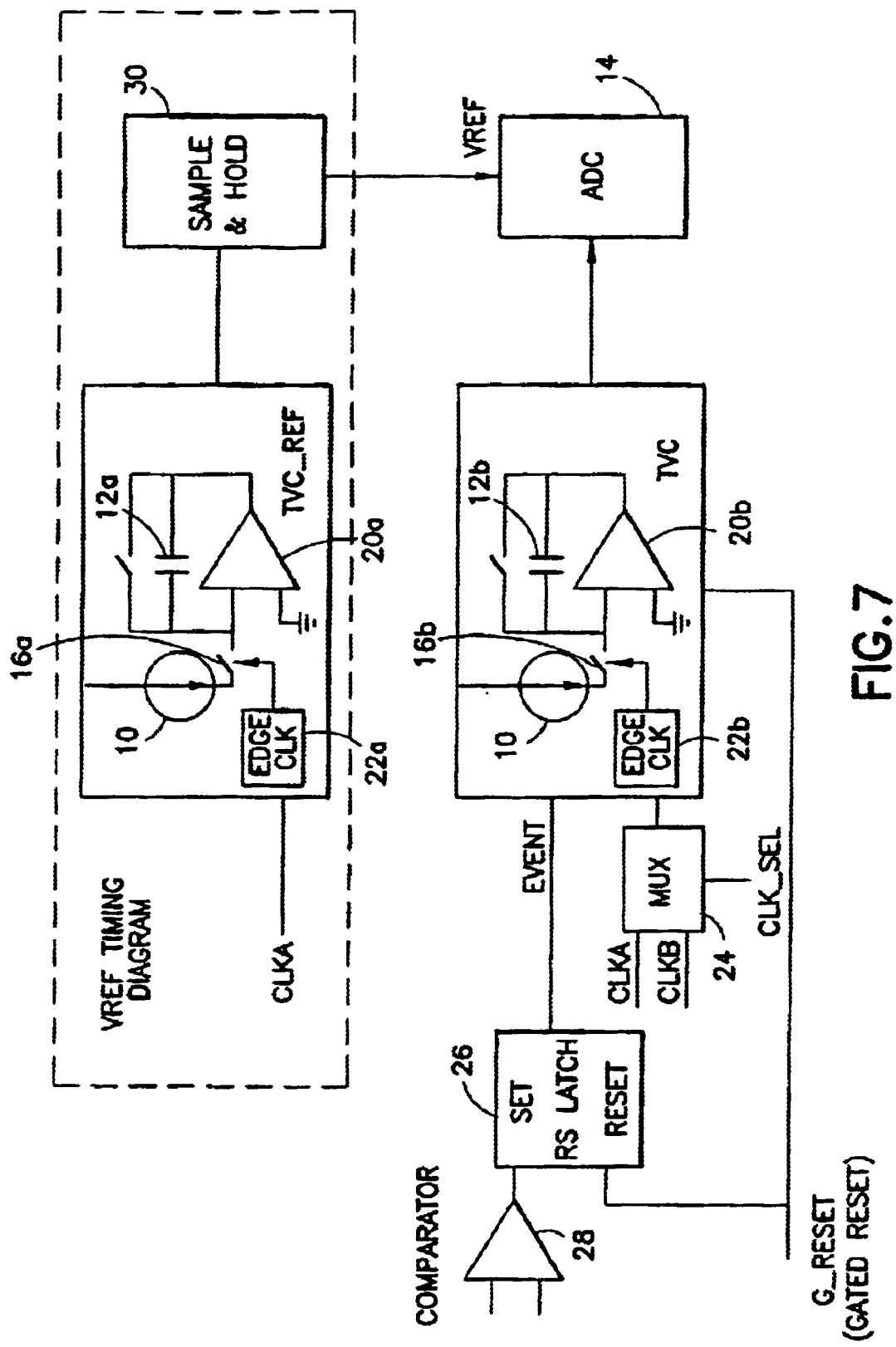
FIG. 7 is a circuit diagram showing a two-phase time-to-voltage converter with auto-calibration in accordance with yet another embodiment of the invention.

Still referring to FIG. 7, a reset latch 26 is placed between the time pick-off comparator 28 and the time-to-voltage converter labeled TVC. A Set input of latch 26 is connected to the output of the comparator 28, while a Reset input of the latch 26 receives a gated reset control signal G_RESET from the digital logic block (not shown). The Set input of the latch 26 receives the event edge and outputs it, maintaining a stable output until the gated reset control signal is received at the Reset input of latch 26. The latter signal is also connected to reset the time-voltage amplifier 20b.

Figure 8:
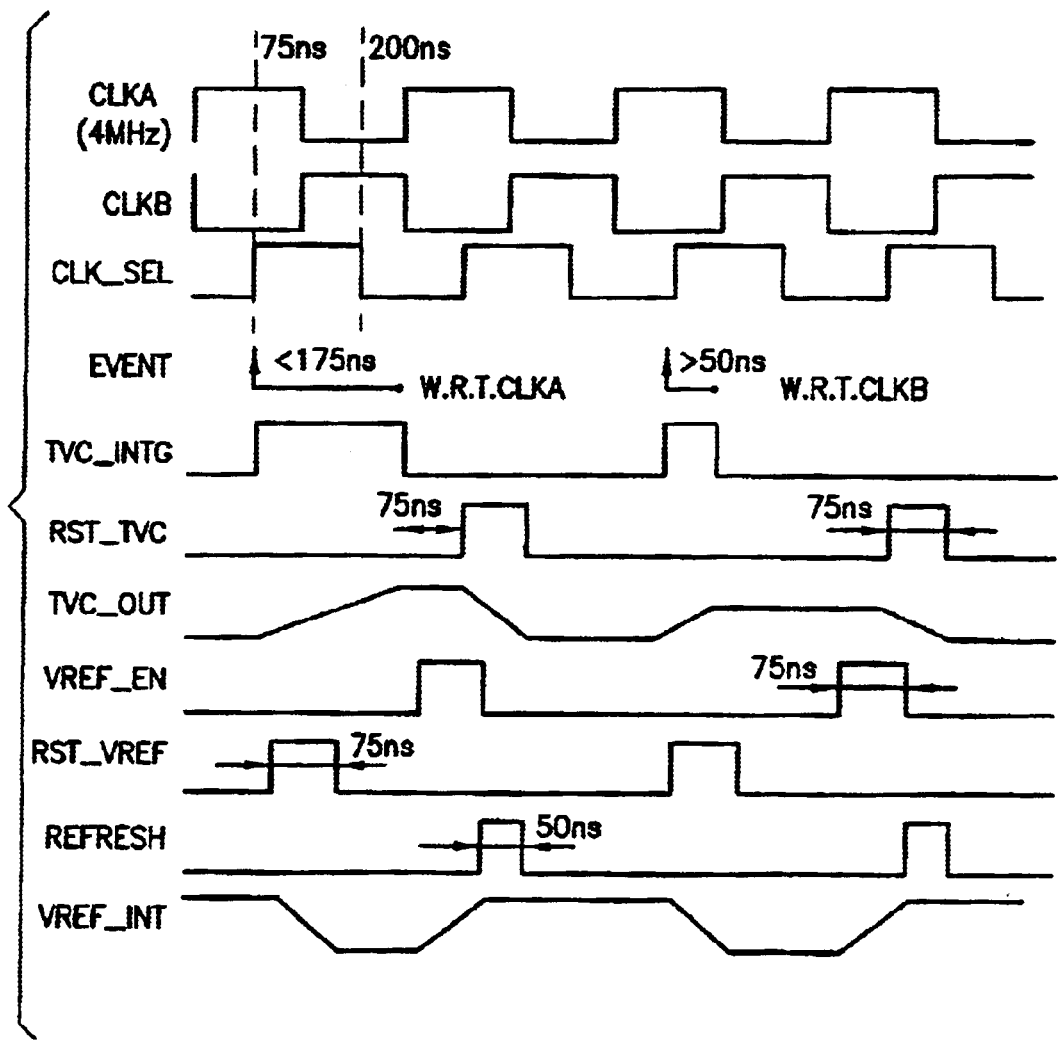
FIG. 8 is a timing diagram for normal operation of the time-to-voltage converter depicted in FIG. 7.

A detailed timing diagram can be seen in FIG. 8, in which the timing signals for the circuitry shown in FIG. 7 are as follows: CLKA, 4-MHz master clock; CLKB, inverted CLKA; CLK_SEL, input to multiplexer 24 in FIG. 7 that selects between CLKA and CLKB; EVENT, gamma ray event to be time stamped; TVC_INTG, integration period to the event TVC; RST_TVC, reset period for the event TVC; TVC_OUT, output of the event TVC; VREF_EN, integration period for TVC_REF; RST_VREF; reset period for TVC_REF; REFRESH, update ADC reference voltage from TVC_REF; and VREF_INT, output of TVC_REF.

Figure 9:
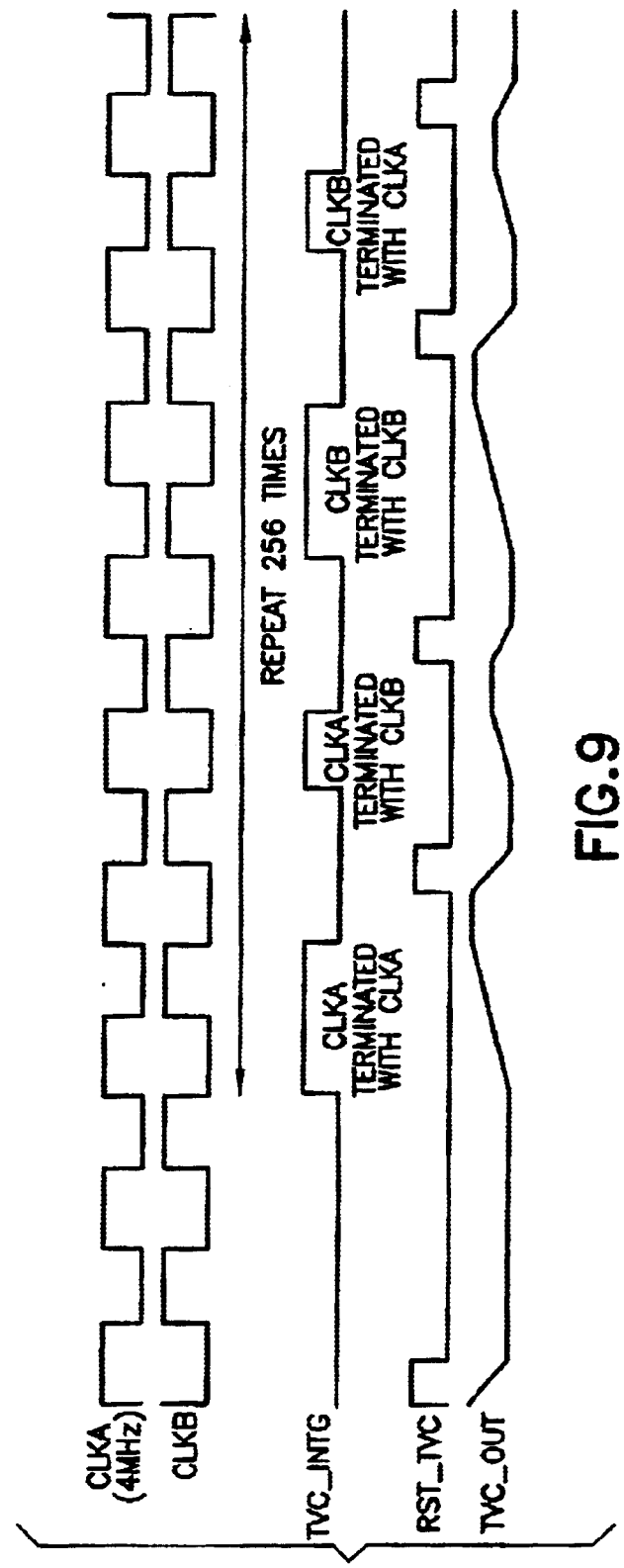
FIG. 9 is a timing diagram for initial reset and calibration.

Since two clocks are being used in FIG. 7 to generate a time stamp, slight variations in the clocks themselves could cause a loss in resolution. In order to counter this, one can derive the clocks from a single source clock that operates at a higher frequency. In this case the ADC 14 will be run at a speed of 40 MHz, and therefore the clock signals for the time-to-voltage converter (4 MHz) can be derived from it. Furthermore, it is necessary to obtain information concerning the duty cycles of CLKA and CLKB, and information concerning the delays between CLKA and CLKB. This information can be obtained by running an initial reset routine followed by a calibration routine, and then storing the results. The information can then be used to calibrate the output in a digital post-operation processing block. The calibration routine is run multiple times (in this case 256) and the resulting data is averaged in order to alleviate the effects of noise. All time stamps are reported with respect to CLKA. The relationship between CLKA and CLKB is determined during calibration. The reset and calibration routine is shown in the timing diagram of FIG. 9, which uses the previously defined nomenclature. For example, DCLB is measured by starting integration with falling edge of CLKB and ending integration with the rising edge of CLKA.

Figure 10:
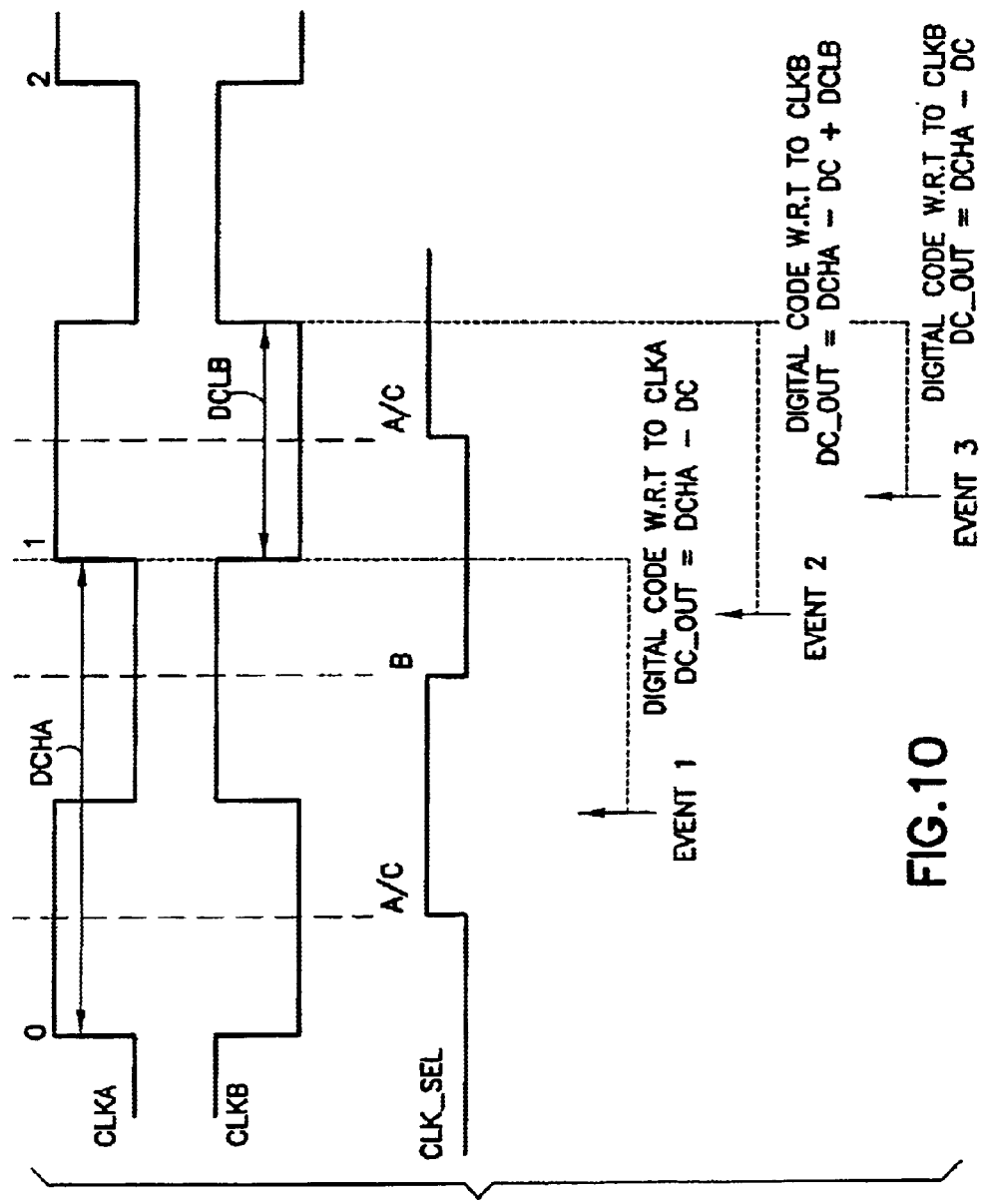
FIG. 10 is a timing diagram for digital code referencing.

The time stamp obtained is referenced to the master clock, which in this case is CLKA, by using one of the two clocks. The method of doing so can be seen in the timing diagram of FIG. 10. Three events are indicated by vertical arrows respectively labeled Event 1, Event 2 and Event 3. The digital code with respect to CLKA for Event 1 is DC_OUT= DCHA DC; the digital code with respect to CLKB for Event 2 is DC_OUT=DCHA DC+DCLB; and the digital code with respect to CLKB for Event 3 is DC_OUT=DCHA DC, wherein DC is the digital code representation of time. DCHA is the digital code representation of the width of CLKA. It is measured by starting the integration at the rising edge of CLKA and ending it at the falling edge of CLKA. DCLB is the digital code representing the low portion of CLKB. It is measured by starting integration at the falling edge of CLKB and ending it with the rising edge of CLKA. These measurements are part of the calibration cycle illustrated in FIG. 9. DC_OUT is always with respect to CLKA since it is the system clock. After the above equations are implemented, the resultant numbers DC_OUT are referred to the rising edge of CLKA. DC_OUT for events 1 and 2 are with respect to rising edge "0" of CLKA and event 3 is with respect to rising edge "1" of CLKA.

The time-to-voltage converters disclosed herein have very low nonlinearity for time stamping events in a PET scanner. The disclosed method eliminates the traditional nonlinearity problems (improper operation of the current source switch) associated with an event edge occurring very close to clock edge. This is done by automatically selecting one of two clocks related to the reference clock and ensuring that the time between an event edge to a clock edge is sufficiently large to properly operate the switch and yield very linear time-to-voltage conversion. The design of the circuit was done in mixed-signal 5 V, 0.5 micron CMOS technology, and simulations show that that the time-to-voltage converter has a nonlinearity of only 32.6 psec with a 4-MHz reference clock across all process corners and environmental variations.

The method and apparatus disclosed herein automatically reference the event edge to one of two available clocks. These two clocks are related to each other and to a global system clock. This ensures that the event edge never occurs sufficiently close to a clock edge to cause nonlinear results. In the above-disclosed embodiments, a multiplexer is used to automatically switch from one clock signal to the other under the control of digital logic that is not depicted in the drawings. In FIG. 5, the clock selecting control signal input to the multiplexer 24 is labeled SEL, while in FIG. 7 it is labeled CLK_SEL. Similarly, the multiplexer 24 shown in FIG. 4 receives a channel selecting control signal (not shown) from suitable digital logic. As used herein and in the claims, the term "digital logic" means any device or circuit, whether implemented in hardware, software or firmware, capable of outputting a periodic binary signal, and the term "multiplexer" means any device or circuit, whether implemented in hardware, software or firmware, capable in a first state of passing a first signal, but not a second signal, to a line or channel and in a second state of passing the second signal, but not the first signal, to the same line or channel.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the term "time-to-voltage converter", when appearing in the same claim with the term "analog-to-digital converter", means a circuit not including an analog-to-digital converter. As used in the claims, the term "radiation" is to be construed broadly to include waves or particles. Thus the term "radiation", when used in the claims, is not limited to gamma rays.

What is claimed is:

1. A device for converting elapsed time into a voltage, comprising means for referencing an event edge either to a first clock signal, if said event edge occurs during a first portion of a clock cycle of said first clock signal, or to a second clock signal different than said first clock signal, if said event edge occurs during a second portion of a clock cycle of said first clock signal, wherein said first and second portions of the clock cycles of said first clock signal are alternating interludes.

2. The device as recited in claim 1, wherein said referencing means comprise a multiplexer having first and second inputs for receiving said first and second clock signals respectively, and a third input for receiving clock selecting control signals, the occurrence of said clock selecting control signals determining the temporal boundaries between said alternating interludes.

3. The device as recited in claim 2, wherein said referencing means further comprise digital logic for outputting said clock selecting control signals to said third input of said multiplexer.

4. The device as recited in claim 1, wherein said first and second clock signals are offset from each other in phase only.

5. The device as recited in claim 1, wherein said referencing means comprise digital logic for issuing clock selecting control signals, the occurrence of said clock selecting control signals determining the temporal boundaries between said alternating interludes.

6. An imaging system comprising:
   an event detector for generating said event edge upon occurrence of an event of interest; and
   a system for converting elapsed time into a voltage as recited in claim 1.

7. The imaging system as recited in claim 6, wherein said event detector comprises a detector that detects impinging radiation.

8. The imaging system as recited in claim 7, wherein said radiation is a gamma ray.

9. The device as recited in claim 1, further comprising:
   an event time-to-voltage converter comprising a first input for receiving said event edge and a second input for receiving a referenced one of said first and second clock signals from said referencing means; and
   an analog-to-digital converter comprising a first input for receiving an output of said event time-to-voltage converter.

10. The device as recited in claim 9, further comprising:
    a reference time-to-voltage converter comprising an input for receiving said first clock signal; and
    a sample and hold circuit comprising an input for receiving an output of said reference time-to-voltage converter,
wherein said analog-to-digital converter further comprises a second input for receiving an output of said sample and hold circuit.

11. The device as recited in claim 10, further comprising a multiplexer for passing said first clock signal either to said referencing means or to said reference time-to-voltage converter.

12. The device as recited in claim 10, further comprising digital logic for deriving said second clock signal from said first clock signal.

13. A method of time stamping an event, comprising the following steps:
    generating an event edge when an event of interest occurs;
    generating a voltage proportional to the time elapsed from reception of said event edge;
    referencing said event edge either to a first clock signal, if said event edge occurs during a first portion of a clock cycle of said first clock signal, or to a second clock signal different than said first clock signal, if said event edge occurs during a second portion of a clock cycle of said first clock signal,
wherein said first and second portions of the clock cycles of said first clock signal are alternating interludes;
    maintaining the generated voltage at a constant value when a rising edge of said referenced one of said first and second clock signals occurs; and
    digitizing said constant voltage value to form a time stamp.

14. The method as recited in claim 13, wherein said first and second clock signals are offset from each other in phase only.

15. The method as recited in claim 13, wherein said first and second clock signals are derived from a single source clock that operates at a higher frequency.

16. The method as recited in claim 13, wherein said event is detection of radiation at a time and a place.

17. The method as recited in claim 16, wherein said radiation is a gamma ray.

18. The method as recited in claim 13, further comprising the step of calibrating said constant voltage value prior to said digitizing step.

19. A system for time stamping an event, comprising:
    means for generating a voltage proportional to the time elapsed from reception of an event edge;
    means for referencing said event edge either to a first clock signal, if said event edge occurs during a first portion of a clock cycle of said first clock signal, or to a second clock signal different than said first clock signal, if said event edge occurs during a second portion of a clock cycle of said first clock signal,
wherein said first and second portions of the clock cycles of said first clock signal are alternating interludes;
    means for maintaining the generated voltage at a constant value when a rising edge of said referenced one of said first and second clock signals occurs; and
    an analog-to-digital converter for digitizing said constant voltage value to form a time stamp.

20. A system for time stamping an event, comprising:
    a circuit for generating a voltage proportional to the time elapsed from reception of an event edge, said circuit comprising a current source, an integrating capacitor and an amplifier connected so that said amplifier outputs voltage proportional to the time elapsed so long as current is being supplied by said current source;
    digital logic for outputting clock selecting control signals;
    a first multiplexer having first and second inputs for receiving first and second clock signals respectively, said first and second clock signals being different, and a third input for receiving said clock selecting control signals, said clock selecting control signals being timed so that said first multiplexer outputs said first clock signal if said event edge occurs during a first portion of a clock cycle of said first clock signal and outputs said second clock signal if said event edge occurs during a second portion of a clock cycle of said first clock signal,
wherein said first and second portions of the clock cycles of said first clock signal are alternating interludes;
    a switch for cutting off current to said amplifier from said current source when said first multiplexer outputs a rising edge of one of said first and second clock signals; and
    an analog-to-digital converter for digitizing the voltage output by said amplifier.

21. The system as recited in claim 20, wherein said first and second clock signals are offset from each other in phase only.

22. The system as recited in claim 20, wherein said first and second clock signals are derived from a single source clock that operates at a higher frequency.

23. The system as recited in claim 20, further comprising:
    a reference time-to-voltage converter comprising an input for receiving said first clock signal; and
    a sample and hold circuit comprising an input for receiving an output of said reference time-to-voltage converter, wherein said analog-to-digital converter also receives an output of said sample and hold circuit.

24. The system as recited in claim 23, further comprising a second multiplexer for passing said first clock signal either to said first multiplexer or to said reference time-to-voltage converter.

25. An imaging system comprising:

an event detector for generating said event edge upon occurrence of an event of interest; and a system for time stamping as recited in claim 20.

26. The imaging system as recited in claim 25, wherein said event detector comprises a detector that detects impinging radiation.

27. The imaging system as recited in claim 26, wherein said radiation is a gamma ray.

28. A time-to-voltage converter comprising:

a circuit for generating a voltage proportional to the time elapsed from reception of an event edge, said circuit comprising a current source, an integrating capacitor and an amplifier connected so that said amplifier outputs voltage proportional to the time elapsed so long as current is being supplied by said current source;

a multiplexer for alternatingly outputting first and second clock signals that are different; and a switch for cutting off current to said amplifier from said current source when said multiplexer outputs a rising edge of one of said first and second clock signals.

29. The time-to-voltage converter as recited in claim 28, wherein said first and second clock signals are offset from each other in phase only.

30. The time-to-voltage converter as recited in claim 28, wherein said first and second clock signals are derived from a single source clock that operates at a higher frequency.

* * * * *